May 2, 1944.　　　C. H. MOORE　　　2,348,179
METHOD AND APPARATUS FOR THE PRODUCTION
OF CYLINDRICAL METAL ARTICLES
Filed July 31, 1943　　　3 Sheets-Sheet 1

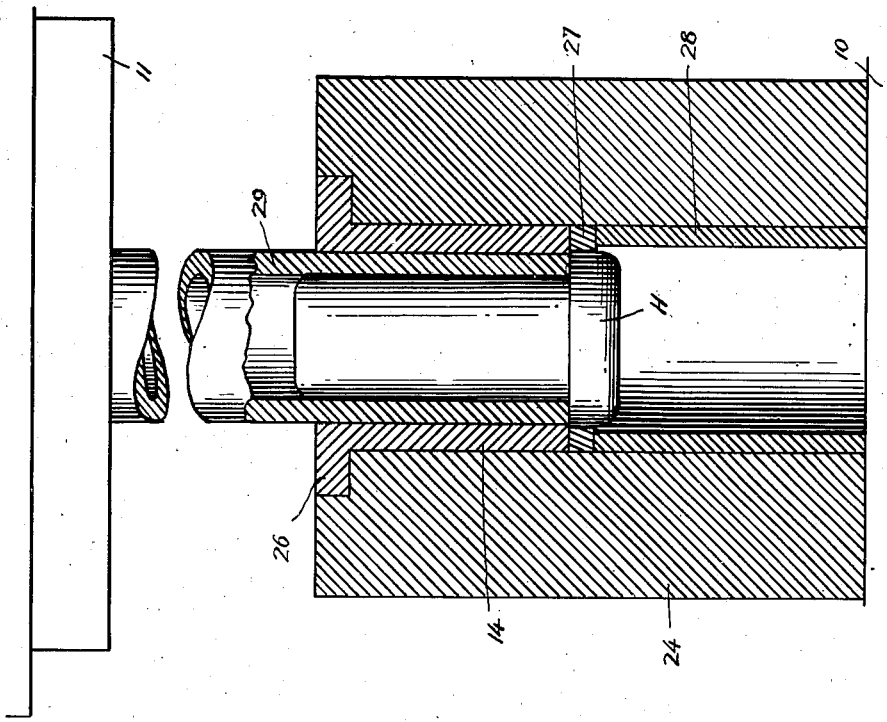
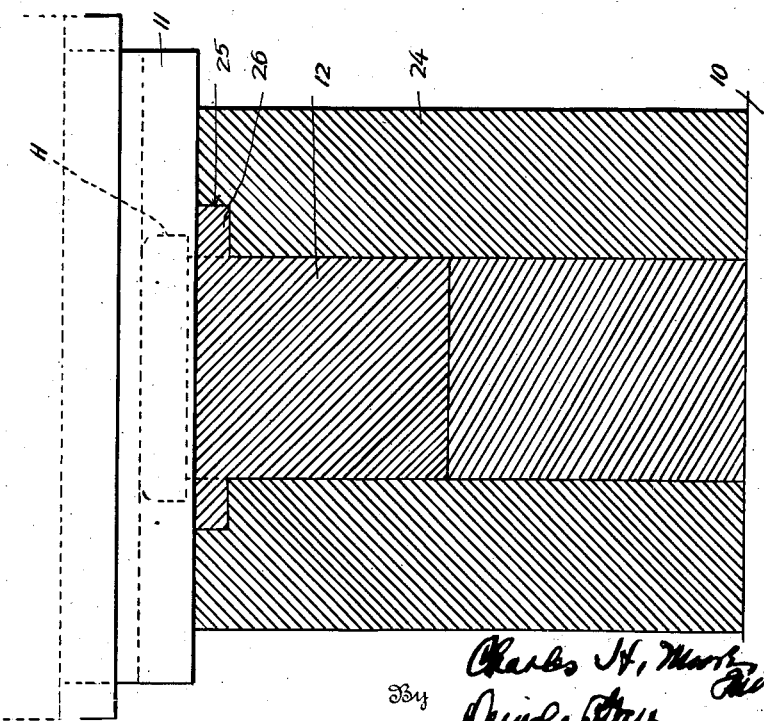

May 2, 1944.  C. H. MOORE  2,348,179
METHOD AND APPARATUS FOR THE PRODUCTION
OF CYLINDRICAL METAL ARTICLES
Filed July 31, 1943   3 Sheets-Sheet 3
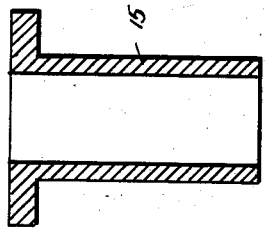
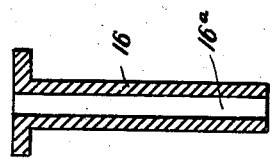
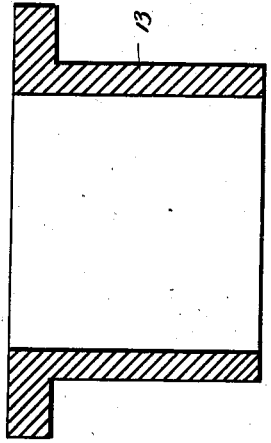
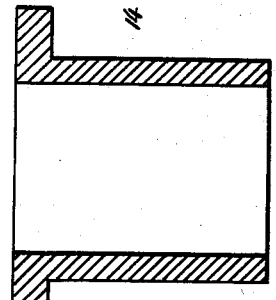
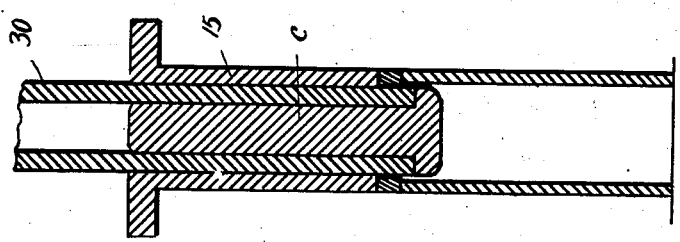

Patented May 2, 1944

2,348,179

UNITED STATES PATENT OFFICE 2,348,179

METHOD AND APPARATUS FOR THE PRODUCTION OF CYLINDRICAL METAL ARTICLES

Charles H. Moore, West Chester, Pa., assignor to Lenape Hydraulic Pressing & Forging Co., Lenape, Pa., a corporation of Delaware Application July 31, 1943, Serial No. 496,946

10 Claims. (Cl. 164—125)

In punching operations heretofore employed in the production of certain types of metal articles, much metal has been lost to further use, due to the fact that to produce such articles a core or plug of substantial size and weight is removed in punching operations. This is true particularly in the manufacture of seamless forged welding necks, wherein the neck is formed by forcing a solid punch through a cylindrical body of proper length and external diameter, thus removing a core or plug equal in diameter to the transverse dimension of the punch; the core or plug thus removed being lost to further use in making additional necks, because of the lack of proper length of the core or plug for such uses, if the same requirements as to quality and size are to be met.

It is the primary object of this invention to provide a method of operating upon the metal body in the formation of the initial welding neck, such as to enable the plug, heretofore lost, to be recovered and used for subsequent operations in producing necks of like overall length and similar form but of reduced lateral dimensions. In this manner, all metal heretofore lost in the manufacture of welding necks is not only recovered, but is utilized in making additional necks, with the loss only of such metal as is removed by machining, or in operating upon the final plug in boring an internal diameter for the smallest size neck.

A further object of the invention is to provide apparatus and a process for producing articles of the type stated, wherein the punching operation is carried out with the use of less pressure than has heretofore been required; wherein the plug or core removed is susceptible of immediate and further use in making additional articles of the same or other type, and wherein the punching operation is performed in such manner that the core or plug removed in one punching operation is simultaneously shaped and prepared for the subsequent further forging and punching or finishing operations.

Figure 2:
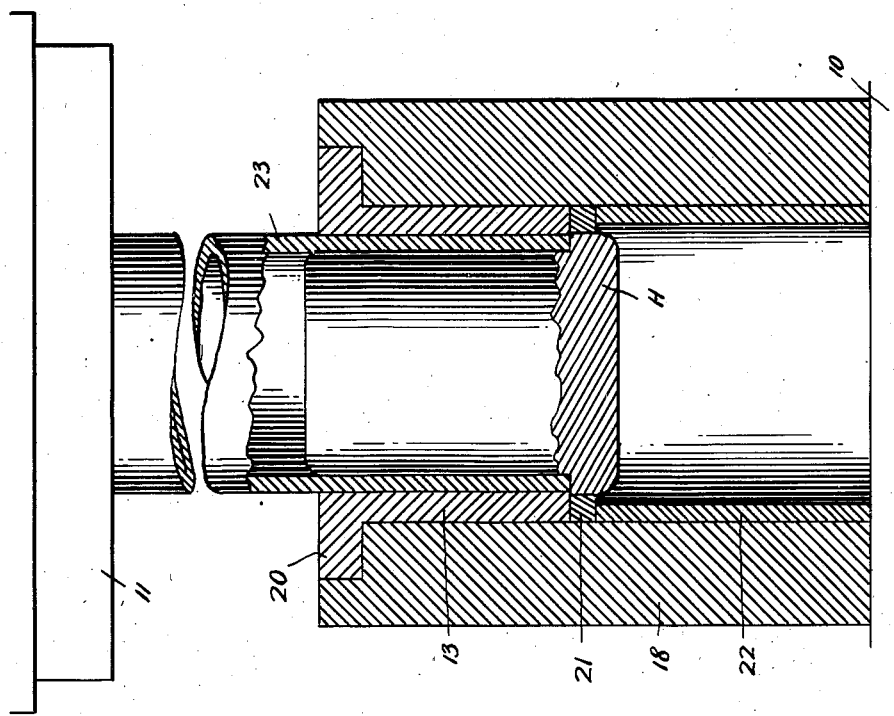
Figure 1:
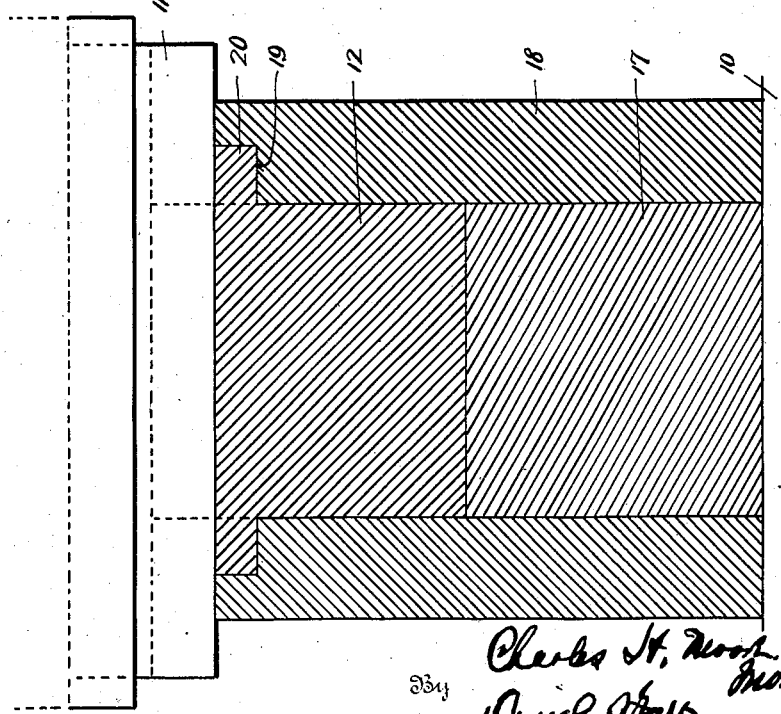

The improved process is carried out in the manner and with the apparatus hereinafter fully set forth, reference being had to the accompanying drawings, wherein Fig. 1 is a vertical section through a press of conventional form and showing a blank in the form of a cylindrical bar of proper length receiving the first pressing operations in the production of a welding neck, Fig. 2 is a similar view showing the punch press properly equipped and operating upon the bar resulting from the operations of Fig. 1, in the production of one welding neck and in the formation of a plug for the production of another neck of smaller lateral dimension, Fig. 3 is a similar view showing the neck plug as produced in Fig. 2 being operated upon by the press to expand the head of the plug into a bolt flange preliminary to further neck producing operations, Fig. 4 shows the plug as produced in Fig. 3 operated upon by a punch in the production of another completed welding neck and in the formation of a headed plug for the production of another neck of still smaller lateral dimension, Fig. 5 is a detail sectional view showing how the hollow punch has produced a complete welding neck from the plug of Fig. 4, and has simultaneously produced another headed core or plug to be operated upon further in the production of still another welding neck, and Figs. 6, 7, 8 and 9 are sectional views of welding necks of progressively decreasing lateral diameters, but all of the same overall length, made in accordance with this invention from one original cylindrical bar of metal.

The invention is here described as for use in the production of forged steel seamless welding necks, but it will be understood that the invention is not limited to such specific use, as it may be employed with equal effectiveness and success in the production of other articles, or the plug removed and recovered may be used for the formation of articles other than welding necks which require the same overall lengths.

In carrying out the invention, use is made of the usual or conventional hydraulic press of proper weight, and wherein 10 represents the bed and 11 the press head.

The body of metal to be operated upon in the production of the initial welding neck is indicated at 12 in Fig. 1, and the several necks successively produced in the progressive operations are identified as 13, 14, 15 and 16.

The body 12 in its original form is a true cylinder, and rests upon the block 17 within the ring die 18; the inner diameter of which corresponds substantially to the external diameter of the said body. The body in its original form, as shown by dotted lines in Fig. 1, projects above the upper end of the die such distance that the projecting body portion, upon the application of downward pressure thereon, will be spread laterally into the annular channel or recess 19 in the upper end of the die to form the required bolt flange 20 at the upper end of the body 12. It will be understood that the dimensions of the recess or channel 19 will be such as to provide a bolt flange of proper proportions and strength for the neck to be formed. Upon completion of this initial pressing operation the body will assume the shape shown by full lines in Fig. 1, and is now ready to be punched axially so as to produce the required through bore and proper side wall thickness. The body 12, in the form shown by full lines in Fig. 1, is placed in the die 18 upon a knife ring 21 which in turn rests upon a supporting sleeve 22 seated in the bottom of the die. The knife ring will be positioned a distance below the upper end of the die corresponding to the overall length of the neck to be produced, and the internal diameter or cutting edge of this ring will be slightly greater than the desired wall thickness of the finished or completed neck. With the body thus positioned within the die, a tubular or hollow punch 23 is properly centered upon the body; this punch having an external diameter equal to the internal diameter of the finished welding neck 13 to be produced, and slightly less than the internal diameter of the knife ring 21, and of an internal diameter corresponding to the external diameter of the plug to be used in the manufacture of a further welding neck of reduced lateral dimension. As the hollow punch 23 is forced downwardly by the press head 11, the hollow interior of the punch accommodates or receives the metal core cut from the body by the lower end of the punch, as shown in Fig. 2. In other words, the metal to be removed in forming the bore of the welding neck 13 wells up in the hollow punch and is given the shape and diameter of the inner surface of the punch, and at the same time some of the metal displaced by the wall thickness of the punch is extruded through the knife ring to provide a head, indicated at H, which will supply the metal for the bolt flange of the welding neck of smaller lateral dimension to be produced from the plug or core. It will thus be seen that as the punch descends the metal core is not only given the proper shape and external diameter for the production of the welding neck of the next succeeding size, but will also be elongated to supply the required length for the said next welding neck, as shown in Fig. 2. When the hollow punch passes entirely through the body 12, the headed and elongated core will be cut free from the body by the knife ring and will drop down into the bottom of the die. The core thus produced is then placed in the die 24 with its headed end uppermost, as shown in Fig. 3, whereupon the press head 11 spreads or expands the head H of the plug into the recess 25 to form the flange 26 for the welding neck 14 now to be produced. After this operation, the die 24 is supplied with a cutting ring 27 and supporting sleeve 28 in the same manner as heretofore described in connection with Fig. 2; the knife ring 27 being of slightly greater internal diameter than the inner diameter of the welding neck 14, as will be understood. The hollow punch 29, having an external diameter corresponding to the desired internal diameter of the welding neck 14, is now brought down properly centered upon the body, whereupon a completed welding neck 14 is produced and a properly shaped, elongated and headed core is provided for the production of another welding neck of smaller lateral dimension but of the same, or greater, overall length as those already produced.

The core now produced will be operated upon by the press to expand the head into the flange groove or channel, in the manner already described, whereupon it will be placed in another ring die of proper dimensions to be further operated upon by the hollow punch 30, as shown in Fig. 5, to produce the completed welding neck 15 and to produce an elongated and headed core to be operated upon in making still another welding neck of smaller lateral dimension but of a length corresponding to those already produced.

The core C, as shown in Fig. 5, may be of such restricted lateral dimension as to preclude further punching in the manner heretofore described, in which event the core C, after being properly headed, will be drilled longitudinally to provide the necessary bore 16$^a$, as shown in Fig. 9.

In the several similar punching operations it will be apparent that the ring dies, flanging recesses and hollow punches will be of the proper dimensions to produce the proper wall and flange thicknesses, lengths and breadths for the welding necks to be produced.

In Figs. 6, 7, 8 and 9 there are shown four welding necks produced from an original body of cylindrical form and all of the same overall length, the first three of which have been completely produced by the hollow punch process, while the fourth has been partly produced by the hollow punch process, but since its lateral dimension is too small for further punching operations the center opening will be drilled. By the process thus described, I am able to produce perfect welding necks of progressively reducing lateral dimensions without the loss or waste of any metal whatever, with the exception of the metal removed in the drilling operation of the last and smallest core, or what will be removed incident to any machining that may be necessary. As an example of the saving of steel I am able to accomplish, the bar or body required for the production of a welding neck of 12" internal diameter is 14¾" in diameter by 15½ long, weighing approximately 750 lbs. By the solid punch process heretofore practiced, the plug removed weighs approximately 501 lbs., which has been a total loss insofar as being utilized for the production of other welding necks of the same grade and length is concerned. By my hollow punch method I am able to make from such core or plug one neck 8" x 12", which by previous methods required a body weighing 355 lbs., one neck 4" x 12", which previously required a body weighing approximately 124 lbs., and one neck 1" x 12", which previously required a body weighing approximately 22 lbs. The last mentioned neck is drilled, and the metal removed by the drilling process is the total amount of the loss. From this it will be seen that an extreme economy of costly steel is accomplished by this simple and easily practiced process. In other words, by the methods heretofore practiced in producing four welding necks of the dimensions stated, approximately 1251 lbs. of virgin new steel bar would have been required, 501 lbs. of which was lost to further use in the production of similar articles, whereas by this method only approximately 750 lbs. of metal is required to produce all four necks, and it will also be understood that the metal core or plug within the descending hollow punch, reenforces the latter and obviates any possibility of collapse of the punch. The hollow punch in its descent through the hot metal body performs a cutting rather than a punching action, and much less power of the press is therefore required.

Having thus described my invention, what I claim is,

1. The method of producing a cylindrical article from a solid metallic body, which consists of supporting the body upon a knife ring within a recess, and forcing through said body a hollow punch of an external diameter slightly less than the internal diameter of said knife ring.

2. The method of producing an article from a solid metallic body, consisting in confining the body upon a knife ring in a recess and forcing concentrically through said body and ring a hollow punch of an external diameter less than the internal diameter of said knife ring.

3. The method of producing an article from a solid metallic body, consisting in supporting the body upon a knife ring within a recess and of an internal diameter substantially equal to the desired internal diameter of the article to be produced, and forcing through said body and ring a hollow punch whose external diameter is substantially equal to the internal diameter of the cutting ring.

4. The method of producing a cylindrical article from a body of cylindrical shape, consisting in supporting the body upon a knife ring within a recess and of an internal diameter substantially equal to the desired internal diameter of the article to be produced, and passing through said body and knife ring concentrically therewith a hollow punch whose external diameter is equal to the diameter of the knife ring.

5. The method of producing a cylindrical article from a solid metallic body, consisting in supporting the body within a die upon a knife ring whose internal diameter is substantially greater than the desired external diameter of the article to be produced, and forcing through said body and ring concentrically thereof a tubular punch whose internal diameter is equal to the desired external diameter of the said article.

6. The method of producing a cylindrical article from a solid metallic body, consisting in supporting the body within a die and upon a cutting ring, and forcing through said body and ring concentrically with the latter a tubular punch whose internal diameter equals the desired external diameter of the article to be produced.

7. The method of producing a tubular article and a cylindrical article simultaneously from a cylindrical body of metal, consisting in arranging the body on one end within a die whose internal diameter equals the desired external diameter of the tubular article to be produced, supporting said body upon a knife ring, and forcing concentrically through said body and ring a hollow punch whose external diameter is slightly less than the internal diameter of said knife ring and whose internal diameter is equal to the desired external diameter of the cylindrical article to be produced.

8. The method of producing a tubular article and a cylindrical article simultaneously from a cylindrical body of metal, consisting in arranging the body on one end within a die whose internal diameter equals the desired external diameter of the tubular article to be produced, supporting said body on a knife ring, whose cross sectional breadth is substantially equal to the desired wall thickness of the cylindrical article, and forcing through said body and knife ring concentrically thereof a hollow punch whose external diameter is slightly less than the internal diameter of said knife ring and whose internal diameter is equal to the desired external diameter of the cylindrical article to be produced.

9. The method of producing a headed cylindrical article from a metal body, consisting in supporting the body of hot metal upon a knife ring, and forcing through said body and ring a hollow punch whose internal diameter is equal to the exterior diameter of the desired cylindrical article and whose exterior diameter is sufficient to clear the knife ring in shearing relationship.

10. Apparatus for the production simultaneously of a tubular article and a headed cylindrical core, comprising a cylindrical mold, a knife ring concentrically arranged within said mold and adapted to support the body of metal from which said articles are to be made, a sleeve in said mold supporting said ring in concentric relationship, said ring having an internal diameter coincident with the diameter of the head to be formed, and a hollow punch for engagement with the body of metal axially alined with said ring and having an external diameter to cooperate in shearing relationship with the cutting edge of said ring and an internal diameter equal to the desired external diameter of the cylindrical article.

CHARLES H. MOORE.